US00RE38946E

(19) United States
(12) Reissued Patent
Bitton

(10) Patent Number: US RE38,946 E
(45) Date of Reissued Patent: Jan. 24, 2006

(54) CHILDREN'S TOY AND BATH SOAP ASSEMBLY

(76) Inventor: Mary K. Bitton, 467 Burano Ct., Agoura, CA (US) 91301

(21) Appl. No.: 08/380,707

(22) Filed: Jan. 30, 1995

Related U.S. Patent Documents

Reissue of:
(64) Patent No.: 5,183,429
Issued: Feb. 2, 1993
Appl. No.: 07/738,338
Filed: Jul. 31, 1991

(51) Int. Cl.
*A63H 3/00* (2006.01)
*C11D 17/04* (2006.01)

(52) U.S. Cl. ..... 446/73; 446/71; 446/75; 510/140; 510/147; 510/148

(58) Field of Classification Search ..... 252/92, 252/93; 446/71, 73, 75; 426/134; 510/140, 510/147, 148
See application file for complete search history.

(56) References Cited

U.S. PATENT DOCUMENTS

| | | | | | |
|---|---|---|---|---|---|
| 1,827,549 | A | * | 10/1931 | Villain | 252/92 X |
| 2,469,589 | A | * | 5/1949 | Barricini | 426/134 X |
| 2,677,913 | A | * | 5/1954 | Swartz | 446/72 X |
| 3,085,883 | A | * | 4/1963 | Collier | 99/137 |
| 3,165,252 | A | * | 1/1965 | Carter et al. | 229/5.5 |
| 3,359,206 | A | * | 12/1967 | Cratsa | 252/92 |
| 3,403,106 | A | * | 9/1968 | Story et al. | 252/92 |
| 4,754,874 | A | * | 7/1988 | Haney | 252/93 X |
| 4,861,505 | A | * | 8/1989 | Farman | 252/92 |

FOREIGN PATENT DOCUMENTS

| | | | | |
|---|---|---|---|---|
| DE | 1956993 | * | 5/1971 | 252/92 |
| DE | 3022003 | * | 12/1981 | 252/92 |
| GB | 27233 | * | 9/1899 | |
| GB | 122 | * | 7/1908 | |
| GB | 627622 | * | 8/1949 | 446/71 |
| GB | 2194246 | * | 3/1988 | 252/92 |

* cited by examiner

*Primary Examiner*—Jacob K. Ackun
*Assistant Examiner*—Jeffrey D. Carlson
(74) *Attorney, Agent, or Firm*—K. David Crockett, Esq.; Crockett & Crockett

(57) ABSTRACT

A small toy or figurine is located inside a transparent body of soap. The soap fully surrounds and encapsulates the small toy. The small toy is completely visible within the body of soap. The body of soap is shaped like a figurine or is in another form which may complement or conform to the shape of the inner toy. A clear or colored plastic container whose shape matches the shape of the body of soap serves as a container for the soap and may also serve as a soap dish. The body of soap is placed inside the plastic container. The small toy incased within the body of soap is visible from outside the plastic container once the body of soap is placed inside the plastic container.

13 Claims, 2 Drawing Sheets

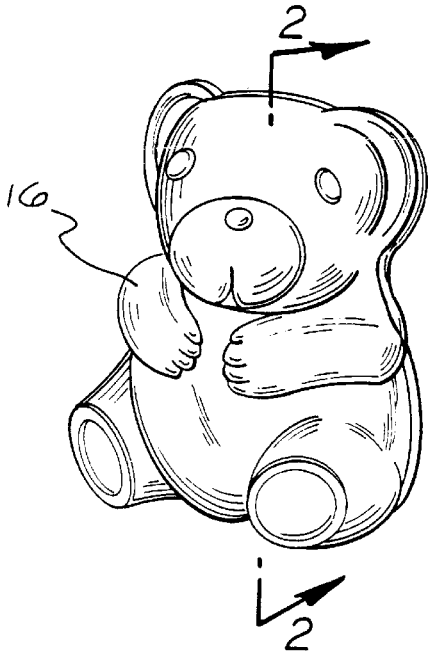
FIG. 1
FIG. 2
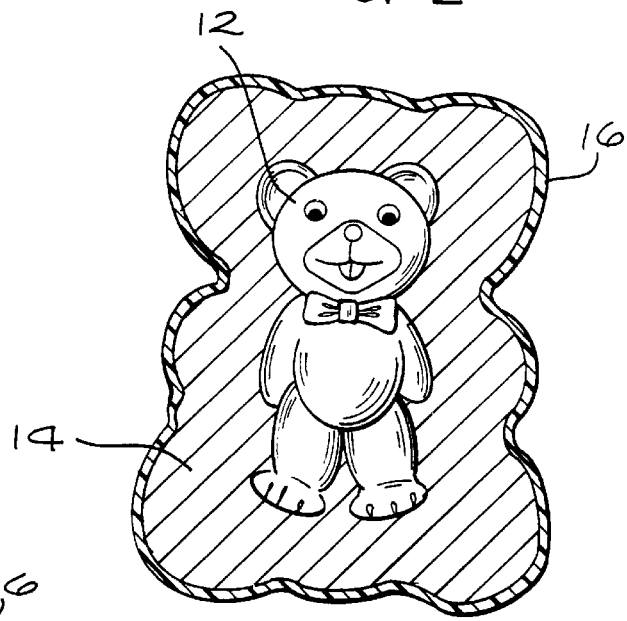
FIG. 3
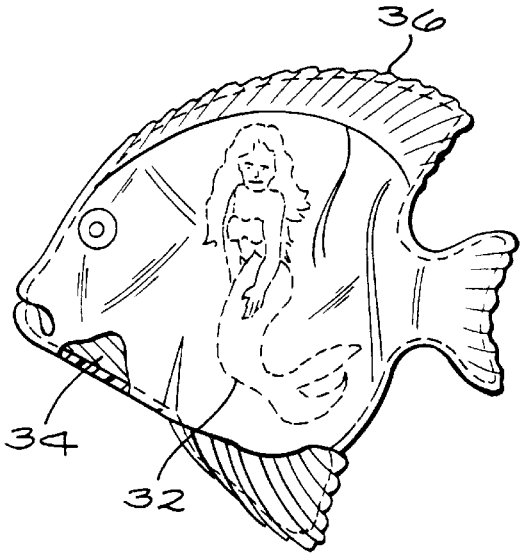
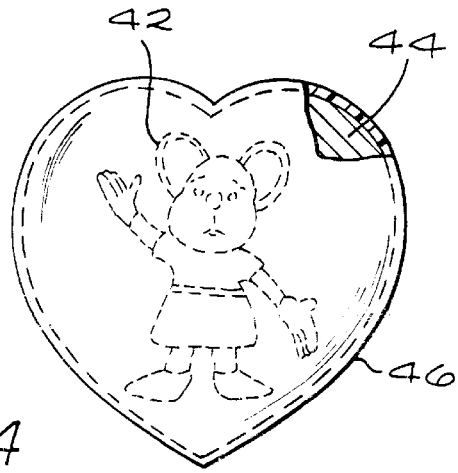
FIG. 4

CHILDREN'S TOY AND BATH SOAP ASSEMBLY

Matter enclosed in heavy brackets [ ] appears in the original patent but forms no part of this reissue specification; matter printed in italics indicates the additions made by reissue.

FIELD OF THE INVENTION

The present invention generally relates to soaps, especially transparent or translucent soaps, combined with children's toys.

BACKGROUND OF THE INVENTION

Children have always exhibited a great propensity and ability for getting dirty. Children are also notorious for not wanting to bathe, and judiciously avoiding the use of soap.

Most children have a highly active imagination and like to play with toys and other figurines. Numerous attempts have been made to entice children to play with soap by crafting the soap in the shape of a figure or toy. Numerous color schemes have also been used in an attempt to entice children to use soap.

Swartz in U.S. Pat. No. 2,677,913, attempted to entice children to play with soap in which a figurine was partially embedded. The head and feet of the figurine protruded from opposite ends of the soap, but was otherwise hidden from view until the soap was used up and the figure exposed. Because the figurine was largely encased in soap, with only head and feet protruding, there was little incentive for a child to use the soap in order to gain access to the figurine.

United Kingdom Patent No. 627,622 tried to provide incentive to a child to use soap by placing a waterproof capsule containing a tiny toy in a transparent or opaque bar of soap having a conventional rectangular shape. The child could see the tiny toy and/or hear a rattle within the container, thereby realizing that this particular bar of soap contained within it a capsule and a tiny toy. However, with the shape of the soap bar being rectangular, an the toy being very small, and no special exterior container, the interest in the soap by the child was minimal. In passing, it is interesting to note how very small the toy actually is in the U.K. patent, in that, for example, the thickness of the soap around the toy is substantially greater than the size of the toy itself.

SUMMARY OF THE INVENTION

It is the object of this invention to get children to want to bathe, wash and play with a body of soap. It is also an object of this invention to provide the incentive for getting children to want to bathe, wash and play with a body of soap. It is a further object of this invention to provide this incentive from the moment a child selects a body of soap to be purchased until the body of soap is substantially used up. It is an additional object of this invention to provide children with a reward for having used up substantially an entire body of soap. Additionally, it is an object of this invention to provide an attractive storage container for the body of soap, and for the reward once the body of soap has been used up.

Preferably, the container is also transparent so that the toy is visible through the container and the transparent shape to encourage sales and use of the product. The toy is large enough to be clearly visible through the container, and large enough that it cannot be swallowed by a child.

CHILD SAFE SIZE

It is also an object of the present invention to insure that all toys or figures embedded in a body of soap fully comply with present child safety standards as to the size of the toy, its composition, and appendages. Specifically, the size of the toy is such that it will not fit into a circular tube with an inside diameter of ¾ of an inch or less.

It is desirable that the toys are quite large relative to the size of the body of soap, and thus, for example, that the thickness of the soap to the toy be less than the maximum dimension of the toys in at least some areas of the assembly.

These and other objects, advantages, and features of the present invention will become readily apparent to those skilled in the art from the following Description of an Exemplary Preferred Embodiment when read in conjunction with the attached Drawings and appended Claims.

BRIEF DESCRIPTION OF THE DRAWINGS

FIG. 1 is a perspective view of a toy assembly including a transparent body of soap shaped like a bear which has embedded in it a toy bear and including and outer transparent housing matching the contained toy;

FIG. 2 is a cross-sectional view of the assembly of FIGS. 1;

FIG. 3 shows a toy assembly including a body of soap in the shape of a fish in which is encapsulated a mermaid;

FIG. 4 shows a toy assembly including a body of soap in the shape of a heart in which is encapsulated a toy mouse;

DESCRIPTION OF THE EXEMPLARY PREFERRED EMBODIMENT

Figure 5:
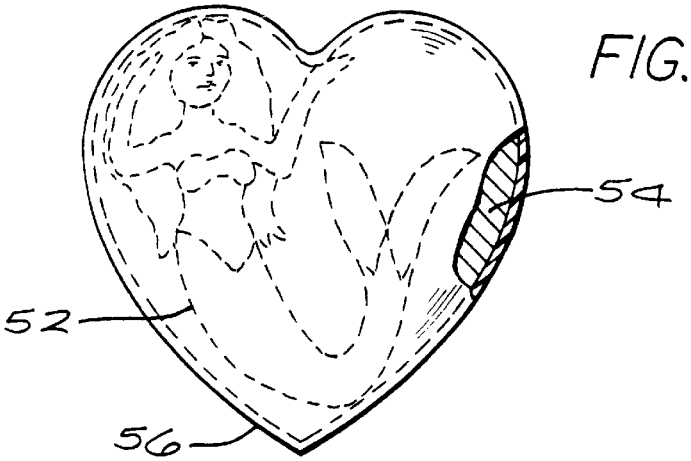
FIG. 5 shows a toy assembly including a body of soap in the shape of a heart in which is encapsulated a mermaid.

The preferred embodiment of the invention consists of a waterproof toy, or figurine 12 which is encapsulated in a body of transparent soap 14. The entire toy or figurine is fully visible through the soap. Th body of soap itself is irregular, in the shape of an object or depiction designed to encourage children to play with it. The shape of a bear (FIGS. 1 and 2), or teddy bear, fish (FIG. 3), heart (FIGS. 4 and 5), car (FIG. 6), star (FIG. 7), and dinosaur (FIG. 8) are examples of soap shapes which have been implemented.

The body of soap itself is further encased in a transparent soap container 16 made of plastic. This soap container may be formed of upper and lower matching portions which fit together to form a complete container. The shape of the soap container is irregular, and conforms to the shape of the body of soap. The soap container serves as a soap dish, as well as a toy, and storage container for future use. In addition, the transparent nature of the soap container allows a child to fully view the toy encapsulated within the body of soap. This allows a child to effectively select the toy, or reward he is to receive after he has substantially used up the body of soap. This provides incentive for the child to bathe, wash and play with the body of soap in an effort to more quickly access the toy he desires which is contained within the body of soap. The soap container can also be colored or tinted to accent or highlight features of the toy or the shape/design of the body of soap.

The configuration of the body of soap is selected to conform to the shape of the toy of figure or complement the shape of the toy or figurine. In conforming to the shape of the toy, the soap container, and body of soap will have a shape either identical to or substantially matching the shape of the toy or figurine contained within the body of soap. For example, FIGS. 1 and 2 illustrate the depiction of a toy bear 12 contained within a body of 14 which is formed in the shape of a bear. Note that the toy bear is upright and depicts a bear walking, whereas the shape of the body of soap, and container 16 depicts a bear which is seated on its hind legs. The shape of the body of soap conforms to the shape of the toy.

Figure 6:
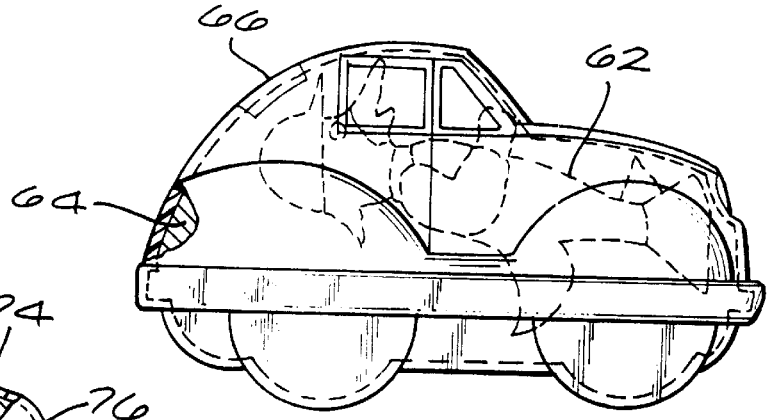
FIG. 6 shows a toy assembly including a body of soap in the shape of a car in which is encapsulated a toy in the shape of a duck.
Figure 7:
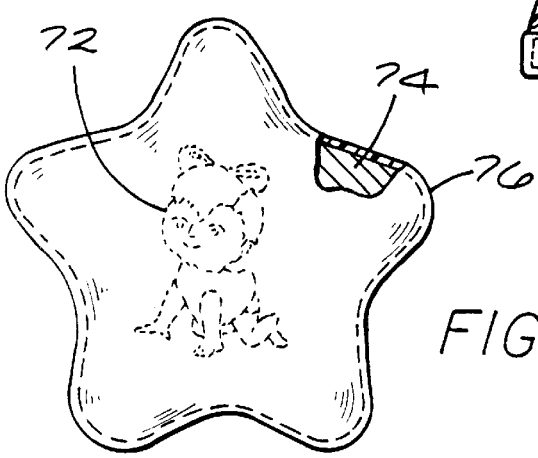
FIG. 7 shows a toy assembly including a body of soap in the shape of a star in which is encapsulated a toy depicting a young girl.
Figure 8:
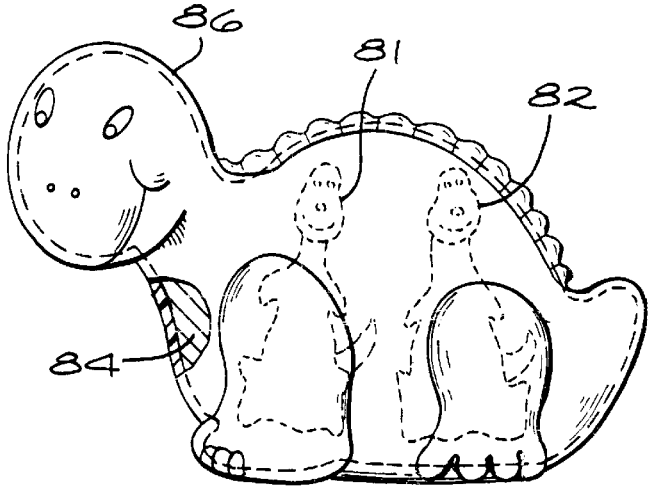
FIG. 8 shows a toy assembly including a body of soap in the shape of a dinosaur in which are encapsulated two toys, both toy dinosaurs.

The configuration of a body of soap and container can complement the shape of the toy contained within the body of soap. FIG. 3 depicts a toy in the shape of a mermaid 32 which is encased within a body of soap 34 depicting a fish. The mermaid toy or figurine and body of soap depicting a fish complement one another. Especially in the eyes of a child, both are associated with creatures that live under water. The configuration shown in FIG. 4 depicts a toy in the shape of a mouse 42 contained within a body of soap 44 and placed in soap container 46 which is formed in the shape of a heart. Additional configurations include FIG. 5 in which a toy in the shape of a mermaid 52 is encapsulated within a body of soap 54 and placed in a soap container 56 which is in the shape of a heart. The configuration in FIG. 6 depicts a toy in the shape of a duck 62 encapsulated in a body of soap 64 which is placed in a container 66 which is formed in the shape of a car. The configuration shown in FIG. 7 depicts a toy in the shape of a girl 72 encapsulated within a body of soap 74 and placed in a container 76 which is formed in the shape of a star. The depiction shown in FIG. 8 shows two toys in the shape of dinosaurs 81 and 82 encapsulated within a body of soap 84 and placed within a soap container 86 which is formed in the shape of a different dinosaur.

The figurine or toy placed within a particular body of soap may be selected independently of the shape of the body of soap itself, but preferable there is a match of one sort or another between the toy and the shape of the soap and of the container, either conforming or complementing one another.

There has been described hereinabove a novel toy embedded in a body of soap. Those skilled in the art may now make numerous uses of the above described embodiment without departing from the inventive concepts. Thus, by way of example but not limitation, the translucent soap may be tinted with a color as desired, and the container may not be entirely transparent, but may be provided with a translucent viewing window or cover and may be otherwise opaque. It is also noted that the soap and toy assembly may be wrapped or enclosed in a clear flexible transparent wrap, in place of the soap container. Accordingly, the present invention is not limited to the specific embodiments disclosed in the drawings and the foregoing detailed description.

I claim:

1. A child's toy and soap assembly comprising:

a waterproof toy having a predetermined irregular three dimensional configuration and predetermined minimum and maximum dimensions;

a body of transparent soap directing engaging and entirely encompassing and encapsulating said waterproof toy, said body of soap having a thickness from its exterior surface to the toy which is less than said maximum dimension in at least one area;

a transparent soap container having a configuration which is matched to the configuration of said body of soap;

said body of soap substantially filling said container;

said soap container being either clear or colored;

said body of soap having an exterior configuration substantially conforming to or complementing the configuration of the encapsulated toy;

said body of transparent soap and said transparent soap container structured such that the entire waterproof toy is directly visible within said body of soap and transparent soap container; and the shape of said soap container conforming to the shape of said toy.

2. A child's toy and soap assembly as described in claim 1 in which said body of soap is colored or tinted.

3. A child's toy and soap assembly as described in claim 1 in which said container is colored and said body of soap is colored or tinted.

4. A child's toy and soap assembly as defined in claim 1 wherein said toy is of substantial size so that it will not fit into a tube which has an inner diameter of ¾ inch.

5. A child's toy and soap assembly comprising:

a waterproof[, inedible, non-metallic] toy having a predetermined irregular three dimensional configuration;

a body of transparent soap directly engaging and entirely encompassing and encapsulating said waterproof toy;

a soap enclosure which is at least partially transparent, said soap enclosure having a configuration which complements the configuration of said body of soap;

said body of transparent soap and said soap enclosure being structured such that the toy is directly visible within said body of soap and said soap enclosure;

said toy being of substantial size so that it will not fit into a tube which has an inner diameter of ¾ inch;

said toy having predetermined maximum and minimum dimensions and said body of soap having a thickness from its exterior surface to the toy which is less than said maximum dimension in at least one area; and said soap enclosure having a shape conforming to the configuration of said toy.

6. A child's toy and soap assembly as described in claim 5 in which said enclosure is colored or tinted.

7. A child's toy and soap assembly as described in claim 5 in which said body of soap is colored or tinted.

8. A child's toy and soap assembly as described in claim 5 wherein said body of soap has an exterior configuration substantially conforming to or complementing the configuration of the encapsulated toy.

9. A child's toy and soap assembly as defined in claim 5 wherein said soap enclosure comprises upper and lower matting portions.

10. A child's toy and soap assembly as defined in claim 9 in which said body of soap substantially fills said enclosure.

[11. A child's toy and soap assembly comprising:

a waterproof, inedible, non-metallic toy having a predetermined configuration;

said toy having a irregular three-dimensional configuration at least including the form of a figure;

a body of transparent soap directly engaging and entirely encompassing and encapsulating said toy;

a soap enclosure which is at least partially transparent, said soap enclosure having a configuration which complements the configuration of said body of soap;

said body of transparent soap and said soap enclosure being structured such that the toy is directly visible within said body of soap and said soap enclosure;

said toy being of substantial size so that it will not fit into a tube which has an inner diameter of ¾ inch;

said toy having predetermined maximum and minimum dimensions and said body of soap having a thickness from its exterior surface to the toy which is less than said maximum dimension in at least one area; and said soap enclosure has a configuration which is in the shape of a figure or a vehicle.]

[12. A child's toy and soap assembly as defined in claim 11 wherein said soap enclosure comprises upper and lower matting portions.]

[13. A child's toy and soap assembly as defined in claim 11 wherein the toy is in the form of an animal figure.]

[14. A child's toy and soap assembly as defined in claim 11 wherein the toy is in the form of the figure or a person.]

*15. A child's toy and soap assembly comprising:*

*a waterproof toy having a predetermined configuration;*

*said toy having an irregular three-dimensional configuration at least including the form of a figure;*

*a body of transparent soap directly engaging and entirely encompassing and encapsulating said toy;*

*a soap enclosure which is at least partially transparent, said soap enclosure having a shape which complements the shape of said toy;*

*said body of transparent soap and said soap enclosure being structured such that the toy is directly visible within said body of soap and said soap enclosure;*

*said toy being of substantial size so that it will not fit into a tube which has an inner diameter of ¾ inch;*

*said toy having predetermined maximum and minimum dimensions and said body of soap having a thickness from its exterior surface to the toy which is less than said maximum dimension in at least one area;*

*said three dimensional toy being in the form of an animal figure; and*

*the soap substantially filling the soap enclosure and being in direct engagement with the soap enclosure on at least one side of said assembly.*

*16. A child's toy and soap assembly comprising:*

*a waterproof toy having a predetermined configuration;*

*said toy having an irregular three-dimensional configuration at least including the form of a figure;*

*a body of transparent soap directly engaging and entirely encompassing and encapsulating said toy;*

*a soap enclosure which is at least partially transparent, said soap enclosure having a shape which complements the shape of said toy;*

*said body of transparent soap and said soap enclosure being structured such that the toy is directly visible within said body of soap and said soap enclosure;*

*said toy being of substantial size so that it will not fit into a tube which has an inner diameter of ¾ inch;*

*said toy having predetermined maximum and minimum dimensions and said body of soap having a thickness from its exterior surface to the toy which is less than said maximum dimension in at least one area;*

*said three dimensional toy being in the form of the figure of a person; and*

*the soap substantially filling the soap enclosure and being in direct engagement with the soap enclosure on at least one side of said assembly.*

*17. A child's toy and soap assembly comprising:*

*a waterproof toy having a predetermined configuration;*

*said toy having an irregular three-dimensional configuration at least including the form of a figure;*

*a body of transparent soap directly engaging and entirely encompassing and encapsulating said toy;*

*a soap enclosure which is at least partially transparent, said soap enclosure and associated packaging having a shape which complements the shape of said toy;*

*said body of transparent soap and said soap enclosure being structured such that the toy is directly visible within said body of soap and said soap enclosure;*

*said toy being of substantial size so that it will not fit into a tube which has an inner diameter of ¾ inch;*

*said toy having predetermined maximum and minimum dimensions and said body of soap having a thickness from its exterior surface to the toy which is less than said maximum dimension in at least one area;*

*said three dimensional toy being in the form of a living thing; and*

*the soap substantially filling the soap enclosure and being in direct engagement with the soap enclosure on at least one side of said assembly.*

* * * * *